United States Patent [19]

Lubowitz

[11] 3,708,459
[45] Jan. 2, 1973

[54] MOLDING POWER PREPOLYMERS
[75] Inventor: Hyman R. Lubowitz, Hawthorne, Calif.
[73] Assignee: TRW Inc., Radondo Beach, Calif.
[22] Filed: June 24, 1970
[21] Appl. No.: 49,382

Related U.S. Application Data

[63] Continuation-in-part of Ser. No. 31,979, April 27, 1970, which is a continuation-in-part of Ser. No. 650,625, July 3, 1967, Pat. No. 3,528,950.

[52] U.S. Cl.............260/65, 260/32.6 N, 260/37 N, 260/47 CP, 260/78 TF, 260/78 UA, 264/331
[51] Int. Cl. ............................................C08g 20/32
[58] Field of Search.......260/47 CZ, 47 P, 78 TF, 65, 260/784, 857 PI

[56] References Cited

UNITED STATES PATENTS

| | | | |
|---|---|---|---|
| 3,179,634 | 4/1965 | Edwards | 260/78 |
| 3,422,064 | 1/1969 | Gall | 260/47 |
| 3,528,950 | 9/1970 | Lubowitz | 260/78.4 |

Primary Examiner—William H. Short
Assistant Examiner—L. L. Lee
Attorney—Daniel T. Anderson, James V. Tura and Alan D. Akers

[57] ABSTRACT

This invention relates to the preparation of molding powders having surface areas ranging from about 100 to 800 square meters per gram. The molding powders are obtained from a polymerizate comprising 10 to 90 percent by weight of a polyamide-acid prepolymer and 10 to 90 percent by weight of a polyimide prepolymer having average molecular weights ranging from about 500 to 6,000. The polymerizate of prepolymers are prepared by reacting approximately stoichiometric amounts of at least one polyfunctional amine, one or more polyfunctional anhydrides, and a monoanhydride characterized by the formula:

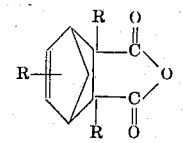

wherein R is selected from the group consisting of hydrogen and lower alkyl radicals having one to five carbon atoms per molecule and combinations thereof.

1 Claim, 1 Drawing Figure

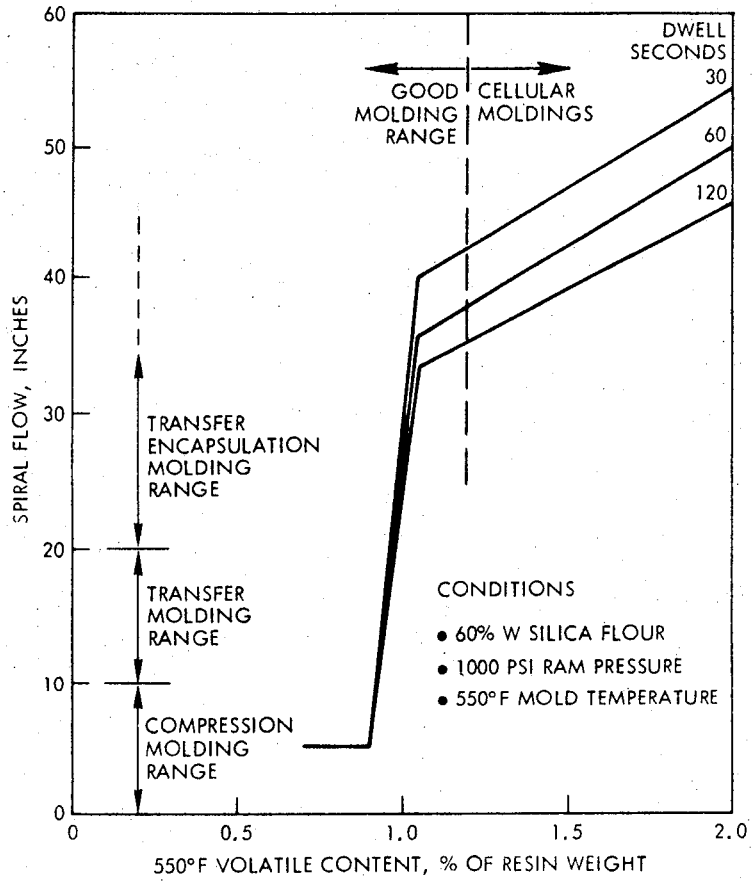

MOLDING POWER PREPOLYMERS

This application is a continuation-in-part of copending application Ser. No. 31,979, filed Apr. 27, 1970, which in turn, is a continuation-in-part of copending application Ser. No. 650,625 filed July 3, 1967, now Patent No. 3,528,950.

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention relates to a molding powder of prepolymers and to the process for preparing same, and more specifically, to a molding powder of prepolymers having particles with a surface area ranging from about 100 to 800 square meters per gram. More particularly, this invention relates to a molding powder comprising a polymerizate of polyamide-acid and polyimide prepolymers having average molecular weights ranging from about 500 to 6,000. The polymerizate of prepolymers are obtained by reacting approximately stoichiometric amounts of at least one polyfunctional amine, e.g., an aromatic diamine, one or more polyfunctional anhydrides, e.g., an aromatic dianhydride and a monoanhydride characterized by the formula:

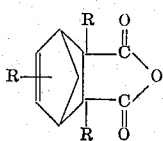

wherein R is selected from the group consisting of hydrogen, lower alkyl radicals having one to five carbon atoms per molecule and combinations thereof.

Presently, polyimide molding powders are prepared from the precursors, i.e., polyamide-acids, which are thermally, oxidatively and hydrolytically unstable, and therefore must be prepared under careful, controlled process conditions. Generally, polyamide-acids undergo two reactions. The first is hydrolysis which breaks the chain and thereby degrades the polymer, and the second is the conversion of the precursor to the corresponding polyimide. Thus, these two reactions are competing and unless something is done to prevent hydrolysis, a useless product will be obtained. Moreover, in utilizing the polyamide-acid prepolymers, it is necessary to follow special techniques to avoid or minimize the voids which will result in the products because of the volatiles produced during curing. Attempts to utilize polyimides in a molding process in place of their precursors, i.e., polyamide-acids, is not feasible because the fusion temperatures of these polymers are too high to allow molding with conventional equipment.

Accordingly, to avoid these and other problems and to provide a molding powder which is comparatively stable at ambient temperatures, it has been found that said molding powder can be obtained from a mixture of comparatively low-molecular weight prepolymers. The prepolymers of this invention may comprise a mixture of polyamide-acid with prevailing amounts of polyimide prepolymer which is thermally and hydrolytically stable at ambient temperatures and therefore may be used in preparing molded articles with the conventional apparatus. More particularly, the molding powders of this invention consist essentially of a polyamide-acid and 10 to 90 percent by weight of at least one polyimide prepolymer which is comparatively stable at ambient temperatures and can be used for preparing molded articles substantially free of voids, e.g., less than 2 percent. The polymerizate of polyimide and polyamide-acid prepolymers may be converted to discreet particles having surface areas ranging from about 1 to 800 square meters per gram and may have substantially all of the volatiles removed prior to being used in the molding process.

Accordingly, it is an object of this invention to provide a molding powder comprising a polymerizate consisting essentially of polyamide-acid and polyimide prepolymers of comparatively low molecular weight.

It is another object of this invention to provide a molding powder comprising polyimide and polyamide-acid prepolymers which are pyrolytically reactive and can be converted to high-molecular weight polyimides under conditions normally used in conventional molding processes.

It is still another object of this invention to provide a process for preparing molding powders from a polymerizate consisting essentially of polyimide and polyamide-acid prepolymers wherein the polyimide prepolymers are thermally and hydrolytically stable and can be converted to the molded product by utilizing conventional molding techniques.

It is still a further object of this invention to provide a molding powder comprising prepolymers of polyamide-acid and polyimides wherein the polyimide is present in prevailing amounts and can be used in a molding process with conventional techniques without giving off a substantial amount of volatile material.

It is still a further object of this invention to provide molded articles characterized as having a low-void content and increased strength obtained from a polymerizate comprising polyimide and polyamide-acid prepolymers of comparatively low-molecular weight which can be pyrolytically converted to the cured polyimide under the conditions normally used in molding techniques.

These and other objects of the invention will become apparent from a further and more detailed description as follows.

It has been found that a rapid cure, stable polyimide having high-temperature stability and improved mechanical properties can be obtained from a mixture of relatively low-molecular weight polyamide-acid and polyimide prepolymers which are chain terminated with monoanhydrides characterized as being reactive at elevated temperatures. More specifically, it has been found that polymerizates comprising polyamide-acid and polyimide prepolymers having average molecular weights ranging from about 500 to 6,000 and preferably from 500 to 3,000 can be obtained by reacting at temperatures ranging up to about 200°C approximately stoichiometric amounts of at least one polyfunctional amine, e.g., an aromatic diamine, one or more polyfunctional anhydrides, e.g., an aromatic dianhydride, and a monoanhydride having the formula:

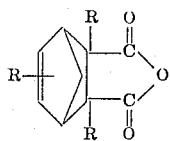

wherein R is selected from the group consisting of hydrogen and lower alkyl radicals having one to three carbon atoms, i.e., methyl, ethyl, propyl, butyl, and amyl radicals.

The polymerizate consists essentially of a mixture of 10 to 90 percent by weight of at least one polyamide-acid prepolymer having the general formula:

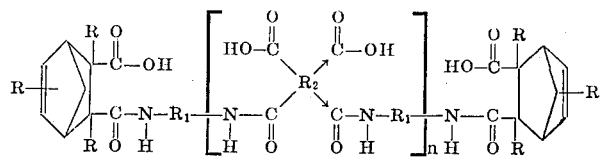

and 10 to 90 percent by weight of a polyimide prepolymer having the general formula:

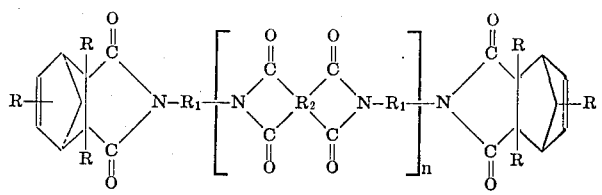

wherein, for example, the polyimide prepolymer may be present in the mixture in amounts ranging up to about 90 percent and preferably 50 to 90 percent by weight. In the above formulas, the arrows denote isomerism wherein in any recurring unit the groups to which arrows point exist as shown or in interchanged positions. The letter $n$ has a value ranging from 1 to 20 and preferably from 1 to 15; R is selected from the group consisting of hydrogen and lower alkyl radicals of one to five carbon atoms and combinations thereof; $R_1$ is selected from the group consisting of an aryl radical, an alkyl radical, a cycloalkyl radical, an aralkyl radical, an alkylaryl radical, an alkylene radical, an arylene radical, a substituted aryl radical, a substituted alkyl radical, a heterocyclic aryl radical, and a substituted aralkyl radical of a polyfunctional amine; $R_2$ may be either the same or different from $R_1$ and is selected from the group consisting of an aryl radical, an alkyl radical, a cycloalkyl radical, an aralkyl radical, an alkaryl radical, an alkylene radical, an arylene radical, a substituted aryl radical, a substituted alkyl radical, a heterocyclic aryl radical and a substituted aralkyl radical of a polyfunctional anhydride.

In preparing the polymerizate, depending upon the reaction temperatures, i.e., temperatures ranging from about 0 to 200°C, the polymerizate may comprise from about 10 to 90 percent by weight of a polyamide-acid prepolymer, 10 to 90 percent by weight of a polyimide prepolymer, and preferably 50 to 90 percent by weight of said polyimide prepolymer. The prepolymers, i.e., the polyimide and polyamide-acid of the polymerizate are comparatively low-molecular weight resin precursors and may have molecular weights ranging from about 500 to 6,000 and preferably from 500 to 3,000, depending upon the particular polyfunctional amine, polyfunctional anhydride, proportions and the reaction conditions employed.

Thus, in preparing the polymerizate of prepolymers, the polyfunctional amines, polyfunctional anhydrides and the monoanhydrides are coreacted or condensed at temperatures ranging from about 0° to 200°C and preferably at temperatures ranging from about 30°C to 200°C. Depending substantially upon the temperature of the reaction, the ratio between the polyamide-acid and polyimide prepolymer will vary from 10 to 90 percent with respect to one another. Thus, for example, in preparing a polymerizate consisting essentially of a polyamide-acid prepolymer, the reaction may be carried out at temperatures ranging from about 0°C to 125°C, and preferably at temperatures ranging from about 0° to 50°C. On the other hand, polymerizates consisting essentially of a polyimide prepolymer, e.g., up to about 90 percent by weight, are obtained by carrying out the reaction at temperatures ranging from about 125°C to 200°C. These prepolymers are converted readily by pyrolytic polymerization, i.e., at temperatures of at least 200°C, and ranging up to about 350° C to a completely imidized polyimide resin having an average molecular weight of at least 10,000.

While it is not completely understood, it is believed that the prepolymers, i.e., the precursors of the polyimide resin having a particular monoanhydride, e.g., 3,6-endomethylene-1,2,3,6-tetrahydrophthalic anhydride in the molecular terminal position when heated to temperatures above 200°C become reactive and pyrolytically polymerize to provide di- and terpolymer molecular linkages producing 3-dimensional macromolecules of higher molecular weight. Since polymerization is due to the pyrolytic reaction of the monoanhydride, it is obvious that this kind of polymerization, which is essentially an addition-type of reaction, takes place without the release of substantial amounts of volatile material. It is possible to produce products with a low-void content, since the products are obtained from prepolymers which are pyrolytically converted to a completely cured polyimide resin under molding conditions. The absence of volatile materials, e.g., water and solvent, result in products which are substantially void-free, i.e., less than 2 percent by volume, and therefore have increased mechanical strengths at higher temperatures.

In preparing the prepolymers of this invention, the polyfunctional amines, e.g. aromatic amines and the monoanhydrides, may be coreacted in any order in the presence of one or more organic solvents. Preferably, however, the prepolymers are prepared by reacting the polyfunctional amine with the monoanhydride and then subsequently with the polyfunctional anhydride in a solvent such as dimethyl formamide. While it is not necessary, it is preferred to react the polyfunctional amine with the monoanhydride and the polyfunctional anhydride in that particular order. The reactants are utilized in approximately stoichiometric proportions, i.e., the equivalence of the amines are calculated to equal substantially the equivalence of the total content of the anhydrides, i.e., the dianhydride and monoanhydride. However, in some instances, an excess, e.g., up to about 5 percent of either the amine or the anhydrides may be used beyond the stoichiometric requirements depending upon the particular reactants and the ultimate use of the product. More specifically, the polyfunctional amine is coreacted with a mixture of the polyfunctional anhydride and the monoanhydride wherein the monoanhydride is present in an amount ranging from about 1 to 60 mol. percent and preferably 5 to 40 mol. percent. As an alternative, the reactants may be thoroughly mixed as dry powders and subsequently added to a solvent, e.g., dimethyl formamide. It has been found that by utilizing thoroughly mixed powders of the reactants it is possible to substantially reduce the processing time while not appreciably affecting the properties of the end products. The relative proportion of the reactants will vary depending upon the molecular weight of each of the reactants and the molecular weight desired of the prepolymers being prepared.

The prepolymers of this invention, i.e., mixtures of the polyimide and polyamide-acid prepolymers may be utilized in the neat form or in combination with one or more fillers including, for example, the fibers and powders of carbon, metal, boron filaments silicates, asbestos, synthetics, metal oxides, and particularly the glass and carbon fibers disclosed in U.S. Pats. Nos. 3,053,775 and 3,011,981. The fillers, e.g., in the powder or fibrous form, and various combinations of these fillers, may be used in preparing molded articles wherein said fillers range from abut 0 to 85 percent and preferably from 10 to 60 percent by weight of the composition.

In preparing the prepolymer polymerizates of this invention, various polyfunctional amines, including the diamines, triamines and tetramines may be used either alone or in combination in any relative proportion, e.g., from 0 to 100 percent by weight. However, the *preferred* polyfunctional amines include the diamines, e.g., aromatic amines containing at least one benzene ring and preferably two benzene rings. The preferred aliphatic amines may have five to 22 carbon atoms per molecule as illustrated below:

2,5-dimethylhexamethylene diamine; 2,5-dimethylheptamethylene diamine; 5-methyl-nonamethylene diamine; 2,17-diamino-eicosadecane; 1,4-diamino-cyclohexane; 1,10-diamino-1-10-dimethyl decane; 1,12-diamino-octadecane; para-phenylene diamine; meta-phenylene diamine; 4,4'-diamino-diphenyl propane; 4,4'-diamino-diphenyl methane; benzidine; 4,4'-diamino-diphenyl sulfide; 4,4'-diamino-diphenyl sulfide; 4,4'-diamino-diphenyl sulfone; 3,3'-diamino-diphenyl sulfone; 4,4'-diamino-diphenyl ether; 1,5-diamino-naphthalene; 3,3'-dimethoxy benzidine; 2,4-bis (beta-amino-t-butyl)toluene; bis-(para-beta-amino-t-butyl-phenyl)ether; bis-(para-beta-methyl-delta-amino-pentyl)-benzene, bis-para-(1,1-dimethyl-5-amino-pentyl)benzene, 1-isopropyl-2,4-metaphenylene diamine; m-xylylene diamine; hexamethylene diamine; heptamethylene diamine; octoamethylene diamine; nonamethylene diamine; decamethylene diamine; diamino-propyl tetramethylene diamine; 3-methylheptamethylene diamine; 4,4'-dimethylheptamethylene diamine; 2,11-diamino-dodecane; 1,2-bis-(3-aminopropoxy)-ethane, 2,2-dimethyl propylene diamine; 3-methoxy-hexamethylene diamine; 3,3'-dimethyl benzidine, etc. and triamines such as 1,3,5-triaminobenzene; 2,4,6-triamino-s-triazine, 1,2,3-triaminopropane; 4,4'4"-triaminotriphenyl methane; 4,4'4"'AEJtriaminotriphenylcarbinol& etcz The polyfunctional anhydrides which may be employed in preparing the prepolymer polymerizates of this invention are preferably dianhydrides, although the tri- and tetra-anhydrides may be used. The polyfunctional anhydrides which are particularly preferred, e.g., aromatic anhydrides containing at least one benzene ring, are included below and merely represent a number of anhydrides which may be used either alone or in combination in any proportion, e.g., ranging from 0 to 100 percent by weight. The anhydrides for purposes of this invention include:

pyromellitic dianhydride, benzophenone tetracarboxylic dianhydride; 2,3,6,7-naphthalene tetracarboxylic dianhydride; 3,3'4,4'-diphenyl tetracarboxylic dianhydride; 1,2,5,6-naphthalene tetracarboxylic dianhydride;

2,2'3,3'-diphenyl tetracarboxylic dianhydride; 2,2-bis(3,4-dicarboxyphenyl)propane dianhydride; 3,4,9,10-perylene tetracarboxylic dianhydride;
bis(3,4-dicarboxyphenyl)ether dianhydride, ethylene tetracarboxylic dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
cyclopentane-1,2,3,4-tetracarboxylic dianhydride;
pyrrolidine-2,3,4,5-tetracarboxylic dianhydride;
pyrazine-2,3,5,6-tetracarboxylic dianhydride;
2,2-bis(2,3-dicarboxyphenyl)propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl)sulfone dianhydride;
Benzene-1,2,3,4-tetracarboxylic dianhydride;
1,2,3,4-butane tetracarboxylic dianhydride;
thiophene-2,3,4,5-tetracarboxylic dianhydride, etc.

The following are specific embodiments illustrating methods of preparing the polymerizate containing the polyimide and polyamide-acid prepolymers and their uses in accordance with this invention.

EXAMPLE I.

Approximately 40.7 parts by weight of 4,4'-methylene dianiline, 32.8 parts by weight of 3,6-endomethylene-1,2,3,6-tetrahydrophthalic anhydride, and 33.9 parts by weight of 3,3',4,4'-benzophenone tetracarboxylic acid dianhydride were dissolved in 170 ml dimethyl formamide and 400 ml toluene. The solution was refluxed for 18 hours during which time water was collected by means of the Dean Stark receiver. At the end of the refluxing period, the solution was cooled to room temperature and filtered. A precipitate or insoluble fraction was collected and dried overnight at 110°C under vacuum. The filtrate was slowly poured into 3 liters of rapidly stirring water, and stirring was continued overnight. During the stirring, a second precipitate formed and was collected by filtration and dried overnight at 110°C under vacuum. The first and second dried precipitates were separately ground into a fine powder. Yields for the first and second precipitates were 32.9 parts by weight and 60.9 parts by weight, respectively. The light yellow second fraction was determined to melt between 158° to 180°C. One part by weight of the second fraction and 1 part by weight of the first fraction were mechanically mixed and placed in a 50 ml beaker. The beaker containing the powder was placed in an oven at 350°C for 30 minutes and then cooled to room temperature. The resulting polymer was brown foam. Thermogravimetric analysis showed the polymer to be stabled to 400°C under nitrogen and had a char residue of 58.9 percent at 800°C. The char residue was glossy black and maintained the original shape of the sample with slightly less mechanical strength.

EXAMPLE II.

A Pyrex reaction vessel fitted with a stainless steel water cooling coil and stirring apparatus was charged with a solution of 3,296 parts by weight methylene dianiline in 4,200 ml of dimethyl formamide. The solution in the reaction vessel was cooled to less than 30°C and maintained at less than 30° throughout subsequent additions. A cooled solution (less than 30°C) of 2,043 parts by weight 3,6-endomethylene-1,2,3,6-tetrahydrophthalic anhydride in 2,338 ml dimethyl formamide was slowly added to the reaction vessel. A slurry of 3,350 parts by weight 3,3',4,4'-benzophenone tetracarboxylic-acid dianhydride in 2,675 ml of dimethyl formamide was slowly added to the reaction vessel. An additional 4,675 ml dimethyl formamide was added to the reaction vessel to dilute the solution (varnish) to the desired 40 percent solids loading. The varnish solution was stirred for one hour to ensure that all reactions had gone to completion to give a completely soluble polyamide-acid solution.

The varnishes had the following properties:
1. Specific gravity 1.092–1.096 at 23° ± 2°C
2. Viscosity 200–300 centipoises at 25°C
3. Acid number 3.5–4.0
4. Gel time (length of time required for varnish to "set up" when dropped on the surface of a hot plate at 600°F) 30–50 sec.

EXAMPLE III

A 500 ml quantity of varnish prepared in Example II was placed in a 1-liter round-bottomed flask and the flask was attached to a vacuum rotary evaporator. An oil bath was used to heat the contents of the flask to 150°C over a 45 minute period. The contents were removed from the flask and finely ground. The ground material was placed in a forced air oven at 125°C until the volatile matter content, measured by subjecting samples of the powder to about 300°C for 30 minutes and measuring the weight loss, reached 5.0 percent. The brown powder was then ready for molding. However, if desired, these powders may be dried to retain anywhere from about 0 to 10 percent by weight of solvent. They may be then subsequently further dried to a solvent content of 0 to 2.0 percent by weight prior to molding.

EXAMPLE IV

Neat molded plugs (1-inch diameter × ¼-inch thick) were made by charging a mold preheated to the desired temperature with 5 grams of the powder prepared in Example III. Various conditions employed to make neat molded plugs are listed below:

| Sample | Dwell Time, Min. | Applied Pressure | Mold Temp. °F | Cure Time, Min. |
|---|---|---|---|---|
| 1 | 3 | 500 | 550 | 30 |
| 2 | 5½ | 1000 | 550 | 30 |
| 3 | 5 | 500 | 600 | 30 |
| 4 | 5 | 1000 | 600 | 30 |
| 5 | 5 | 1500 | 600 | 30 |

Barcol hardnesses for the cured samples were 46, 47, 46, 47 and 48, respectively. All samples cured as above were brown to black in color.

The samples were aged in air (100 cc/min) at 315°C. Weight loss was as follows:

| Sample | 100 hrs. | 500 hrs. | 800 hrs. |
|---|---|---|---|
| 1 | 5.5% | 26% | 48% |
| 2 | 3.0% | 12% | 24% |
| 3 | 3.0% | 14% | 32% |
| 4 | 3.5% | 14% | 23% |
| 5 | 3.0% | 8% | 15% |

The cured plugs undergo no physical changes upon standing at room temperature.

EXAMPLE V.

About 39.84 parts by weight of methylene dianiline was dissolved in 65 parts by weight of dimethyl formamide with heating. 41.90 parts by weight of 4,4'diaminodiphenyl sulfide were dissolved in 65 parts by weight of dimethyl formamide and then combined with the methylene dianiline solution. The amine solution was cooled below 30°C and maintained at about 30°C throughout the addition of the anhydride solutions. A methyl Nadic anhydride solution was prepared by dissolving 54.83 parts by weight of 4-methyl,3,6-endomethylene,1,2,3,6-tetrahydrophthalic anhydride in 50 parts by weight of dimethyl formamide. This solution was slowly added to the mixed amine solution with stirring. A solution, prepared by dissolving 77.59 parts by weight of 3,3',4,4'-benzophenone tetracarboxylic acid dianhydride in 160 ml. of dimethyl formamide with heating, was slowly added to the mixed amine-methyl Nadic anhydride solution and the entire solution or varnish was stirred for 30 minutes. The brown varnish had a viscosity of 363 centipoise at 26°C.

EXAMPLE VI.

The varnish prepared in Example V was placed in a 1 liter round-bottomed flask and the flask was attached to a vacuum rotary evaporator. An oil bath was used to heat the contents of the flask to 155°C over a 35-minute period. The contents were removed and dried in a forced air oven at 140°C until a volatile matter content of 1.8 percent was reached.

EXAMPLE VII.

Powder prepared in Example VI was molded under the following condition to produce tensile bars:

| | |
|---|---|
| Tensile bar mold temperature | 575°F |
| Powder charge | 3.5 gms |
| Dwell | 60 sec |
| Molding pressure | 2000 |
| Cure time | 1 hour |

Specimens molded in the above manner were found to have the following physical properties:

| | |
|---|---|
| Specific gravity: | 1.31 |
| Stress: | 8250 |
| Modulus: | 4.65 × 10⁶ psi |
| Elongation: | 2.23% |

Samples were shown to have excellent thermal and oxidative stability when tested in air (100 cc/min) at 600°F.

EXAMPLE VIII.

A solution was prepared by dissolving 85.54 parts by weight of methylene dianiline in 160 parts by weight of dimethylformamide with heating. This solution was cooled to below 30°C and maintained at less than 30°C throughout the entire varnish preparation. 60.54 parts by weight of Nadic anhydride, i.e., 3,6-endomethylene 1,2,3,6-tetrahydrophthalic anhydride were dissolved in 40 parts by weight of dimethyl formamide with heating and added to the amine solution with stirring. 53.88 parts by weight of pyromellitic dianhydride was dissolved in 118 parts by weight of dimethylformamide with heating. This solution was added to the amine-Nadic anhydride solution. The varnish solution was stirred about 45 minutes. The physical characteristics of the varnish (solution) were:
Viscosity   92 Cps at 23°C
Specific gravity 1.080 at 23°C
The varnish was stored at room temperature.

EXAMPLE IX.

The varnish prepared in Example VIII was placed in a 1-liter round-bottomed flask and the flask attached to a vacuum rotary evaporator. The varnish was heated to 140°C for a 1-hour period with the aid of an oil bath. The material was removed from the flask and dried in a forced air oven at 140°C until a volatile matter content of 4.4 percent was attained. At this time, the material was ball milled to a fine powder.

EXAMPLE X

Neat molded plugs were prepared from the powder made in Example IX. A preheated mold at 630°F was charged with 5 grams of powder and a dwell time of 3 minutes was allowed. The sample was cured under 1,000 psi for 30 minutes. Samples prepared in the above manner were dark in color and had a Barcol hardness from 41 to 44.

EXAMPLE XI

The following ingredients were ground and mixed together to form a uniform powder:

| | Parts by Weight |
|---|---|
| Methylene dianiline | 227.6 |
| Nadic anhydride (3,6-endomethylene-1,2,3,6-tetrahydrophthalic mono-anhydride) | 141.0 |
| Benzophenone tetracarboxylic-acid dianhydride | 231.2 |

The above powder was slowly added to 996 ml dimethyl formamide at a temperature of about 30°C. After all the powder had been added, the solution was stirred 1 hour. The varnish prepared in the above manner had the following properties:

| | |
|---|---|
| Acid number | 3.81 |
| Viscosity | 390 Cps at 24°C |
| Specific gravity | 1.095 at 24°C |

EXAMPLE XII.

The varnish of Example XI was processed to a powder form by spray drying using a Bowen Engineering conical laboratory spray dryer. In the spray drying operation, the varnish fed at approximately 100 ml/min was atomized by a centrifugal wheel system and contacted with air heated to 600°F by an electric heater. The air, approximately 250 CFM, was pulled through the drying chamber by a centrifugal blower. A cyclone collector was used to remove the powder from the hot air stream. The volatile matter content of the light brown powder processed in the above manner ranged from 7 to 10 percent.

The organic solvent which may be utilized in preparing the prepolymer polymerizates include various organic liquids whose functional groups do not react with the prepolymers. Normally, organic solvents comprising the N,N-dialkylcarboxylamines are useful. The preferred solvents, however, are the lower molecular weight material including N, N-dimethyl formamide, N,N-dimethyl acetamide, N,N-diethyl formamide, N,N-diethyl acetamide and N,N-dimethylmethoxyacetamide, etc. In addition, solvents which may be used include the dimethylsulfoxides N-methyl-2-pyrrolidone, pyridine, formamide, N-methyl-formamide, butyrolactone, etc. These solvents may be used either alone or in combination with other organic liquids, including, for example, benzene, dioxane, butyrolactone, toluene, xylene, cyclohexane, and various mixtures thereof in any proportion.

It should be noted from FIG. 1 that good molding is obtained from the mixture of prepolymers, i.e., polyamide-acid and polyimide prepolymers, when the prepolymers contain up to about 1 percent by weight of volatiles. FIG. 1 shows the plot of the volatile content versus the spiral flow for three dwell time studies. All of the tests were performed at 550°F, with 1,000 psi for about 30 minutes cure time. It is evident from FIG. 1 that there is a sharp point of inflection of 1 percent volatile content. A sharp break shows that both compression and transfer molding compounds (low and high flow respectively) can be made from low-volatile content powders. All specimens molded from compounds utilizing powder with 1.2 percent volatile content or less were well cured and free from cellularity. The molding composition contained 325 mesh silica flour and one-fourth inch glass fibers which were predried for about 2 hours at 250°F in an air-circulating oven. After cooling in a desiccator, they were dry-blended with various volatile content powders by tumbling in a ball mill. The powder, even though ground and sieved, had a large portion of particles only slightly smaller than 200 mesh.

The inter-relationship between the volatile content, the neutralization number, and the inherent viscosity can be understood by referring to the data in Table 1.

viscosity of the polymerizate increases, which indicates the degree of conversion of the polyamide-acid to the imidized prepolymer. For example, as the reactancts are heated to obtain a polymerizate containing about 90 percent polyamide-acid prepolymer, the neutralization or acid number increases. However, when the polymerizate is heated at the appropriate temperatures to convert the polyamide-acid to polyimide prepolymer, i.e., approximately 90 percent polyimide, the acid or neutralization number approaches zero. When the volatile content decreases as the resident time and temperature increases, e.g., to about 200°C, the polyamide-acid is converted to the polyimide prepolymer as indicated by a decreasing neutralization (acid) number and an increase in the inherent viscosity.

The polymerizate of prepolymers, when subjected to molding temperatures and pressures were pyrolytically cured to crosslinked polyimides which may be characterized as 3-dimensional, pyrolytically-polymerized, polyimide macromolecules having outstanding thermal and mechanical properties. Although the specific mechanism by which the cured resins are obtained is not completely understood, it is believed that the monoanhydride groups become reactive at temperatures above 200°C and produces chemical species which undergo addition-type di- and terpolymerization to form macromolecules having molecular weights of at TABLE 1.—VOLATILE CONTENTS, NEUTRALIZATION NUMBERS, AND INHERENT VISCOSITIES AFTER HEATING

| | | 175° C. | | | | 200° C. | | |
|---|---|---|---|---|---|---|---|---|
| | Initial | 1 hr. | 2 hr. | 3 hr. | 4 hr. | 10 min. | 40 min. | 100 min. |
| Run number 1: | | | | | | | | |
| Volatile content, percent w./w. | 10.1 | 3.2 | 2.8 | 2.8 | 2.3 | 2.4 | 2.3 | 2.6 |
| | 9.9 | 3.2 | 3.0 | 2.7 | 2.3 | 2.5 | 2.2 | 2.1 |
| Neutralization number, meq./g. | 1.37 | 0.54 | 0.62 | 0.58 | 0.48 | 0.52 | 0.27 | 0.39 |
| | 0.84 | 0.45 | 0.67 | 0.49 | 0.53 | 0.50 | 0.22 | 0.28 |
| Inherent viscosity, dl./g. | 0.104 | 0.146 | 0.150 | 0.144 | 0.156 | 0.163 | 0.195 | 0.203 |
| | 0.108 | 0.148 | 0.152 | 0.144 | 0.174 | 0.185 | 0.195 | 0.203 |
| Run number 2: | | | | | | | | |
| Volatile content, percent w./w. | 8.1 | 3.7 | 3.5 | 3.3 | 3.7 | 3.4 | 3.0 | 3.3 |
| | 7.7 | 4.1 | 3.7 | 3.7 | | 3.6 | 2.7 | 3.2 |
| Neutralization number, meq./g. | 0.64 | 0.53 | 0.65 | 0.43 | 0.60 | 0.34 | 0.26 | 0.31 |
| | 0.67 | 0.49 | 0.62 | 0.60 | 0.57 | 0.47 | 0.35 | 0.25 |
| Inherent viscosity, dl./g. | 0.116 | 0.167 | 0.173 | 0.167 | 0.181 | 0.179 | 0.213 | 0.236 |
| | 0.124 | 0.169 | 0.168 | 0.168 | 0.154 | 0.154 | 0.212 | 0.235 |
| Run number 3: | | | | | | | | |
| Volatile content, percent w./w. | 7.5 | 3.5 | 3.0 | 3.7 | 3.5 | 3.0 | 2.7 | 2.9 |
| | 7.1 | 3.6 | 3.5 | 3.8 | | 3.2 | 2.6 | 2.6 |
| Neutralization number, meq./g. | 0.57 | 0.50 | 0.53 | 0.51 | 0.51 | 0.42 | 0.24 | 0.22 |
| | 0.66 | 0.46 | 0.52 | 0.56 | 0.52 | 0.44 | 0.36 | 0.23 |
| Inherent viscosity, dl./g. | 0.122 | 0.172 | 0.175 | 0.171 | 0.177 | 0.177 | 0.215 | 0.233 |
| | 0.129 | 0.174 | 0.176 | 0.171 | 0.175 | 0.173 | 0.212 | 0.229 |

The data shows that as the volatile content decreases, the acid content of the polymerizate also decreases as indicated by the neutralization or acid number. Moreover, as the volatile content and neutralization or acid number decreases, the inherent least 10,000. The chemistry associated with the preparation of the prepolymer polymerizate capped with the appropriate monoanhydride can be understood by referring to the following equations wherein R, $R_1$ and $R_2$ and $n$ are as previously described.

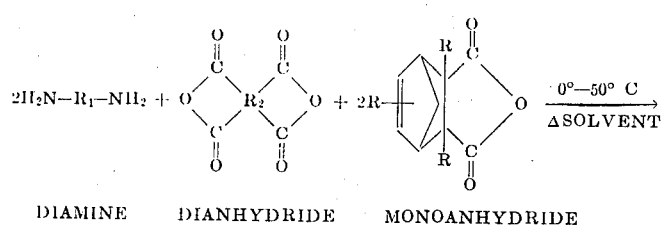

DIAMINE    DIANHYDRIDE    MONOANHYDRIDE

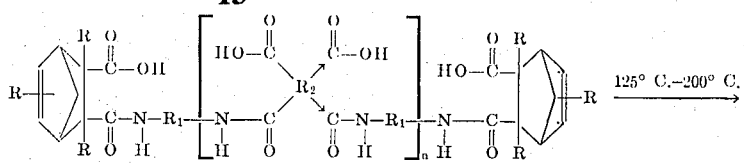

PREPOLYMERS OF AMIC-ACIDS OR POLYAMIDE-ACIDS AND ISOMERS

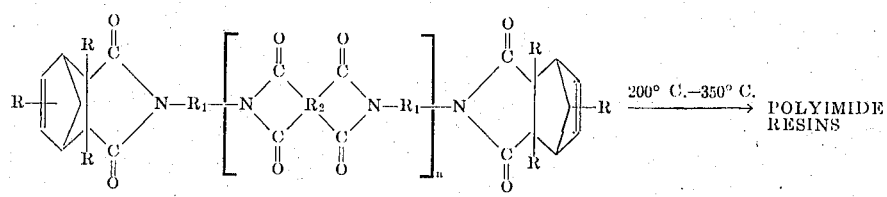

POLYIMIDE PREPOLYMERS

The prepolymers prepared in the above examples may be converted by various means, e.g., ball milling, etc., to molding powders having particles with surface areas ranging from about 1 to 800 square meters per gram and preferably from 50 to 600 square meters per gram. The surface area may be measured by absorption of nitrogen from a gas stream of nitrogen and helium at liquid nitrogen temperature, using the technique described by F. M. Nelson and F. T. Eggersten [Analytical Chemistry 30, 1387 (1958)].

While this invention has been described with respect to a number of specific embodiments, it is obvious that there are other variations and modifications which can be made without departing from the spirit and scope of the invention as particularly pointed out in the appended claims.

What is claimed is:

1. A molding powder of prepolymers having particles with surface areas ranging from about 100 to 800 square meters per gram consisting essentially of 10 to 90 percent by weight of at least one polyamide-acid prepolymer having the general formula:

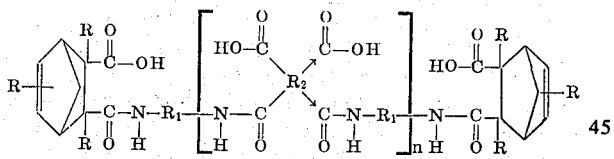

and 10 to 90 percent by weight of at least one polyimide prepolymer having the general formula:

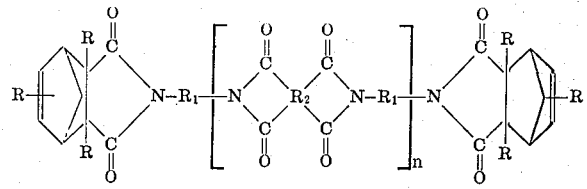

wherein $n$ has a value ranging from 1 to 20; R is selected from the group consisting of hydrogen and lower alkyl radicals having one to five carbon atoms; $R_1$ is methylene biphenylene

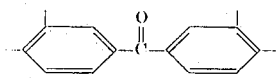

* * * * *